(12) United States Patent
Baltzer et al.

(10) Patent No.: US 6,672,460 B2
(45) Date of Patent: Jan. 6, 2004

(54) VIBRATING SCREEN ASSEMBLY WITH INTEGRATED GASKET AND FRAME

(75) Inventors: Terry L. Baltzer, Talala, OK (US); Russell Allen Riddle, Chelsea, OK (US)

(73) Assignee: Southwestern Wire Cloth, Inc., Tulsa, OK (US)

( * ) Notice: Subject to any disclaimer, the term of this patent is extended or adjusted under 35 U.S.C. 154(b) by 250 days.

(21) Appl. No.: 10/040,202

(22) Filed: Oct. 22, 2001

(65) Prior Publication Data

US 2002/0056667 A1 May 16, 2002

Related U.S. Application Data

(63) Continuation-in-part of application No. 09/420,089, filed on Oct. 18, 1999, now Pat. No. 6,439,392, and a continuation-in-part of application No. 09/317,385, filed on May 24, 1999, now Pat. No. 6,269,954, and a continuation-in-part of application No. 08/922,205, filed on Sep. 2, 1997, now Pat. No. 5,967,336.

(51) Int. Cl.⁷ ................................................ B07B 1/49
(52) U.S. Cl. ........................................ 209/403; 209/405
(58) Field of Search ............................... 209/403, 405, 209/399, 408, 411; 210/389, 498, 499

(56) References Cited

U.S. PATENT DOCUMENTS

| | | | | |
|---|---|---|---|---|
| 5,392,925 A | * | 2/1995 | Seyffert ..................... | 209/405 |
| 5,598,931 A | | 2/1997 | Hosogoshi et al. ......... | 209/405 |
| 5,690,826 A | * | 11/1997 | Cravello .................... | 210/384 |
| 5,967,336 A | | 10/1999 | Baltzer et al. ............. | 209/403 |

FOREIGN PATENT DOCUMENTS

| | | | |
|---|---|---|---|
| SU | 1235555 | 6/1986 | ................ 209/405 |

\* cited by examiner

*Primary Examiner*—Kenneth W. Noland
(74) *Attorney, Agent, or Firm*—Head, Johnson & Kachigian

(57) ABSTRACT

A vibrating screen assembly having a tubular frame. The tubular frame includes a pair of opposed tubular sides and a pair of opposed tubular ends. An upstanding lip extending from each side and extending from each end forms a rim enclosure. A ledge extends inwardly from the opposed sides. A perforated plate with a plurality of screen cloths thereon is positioned within the rim enclosure and secured to a planar surface of the frame. A slot in the tubular sides and tubular ends forms a continuous channel and an elastomeric gasket is press fit into the slot and held therein without adhesives or fasteners.

25 Claims, 10 Drawing Sheets

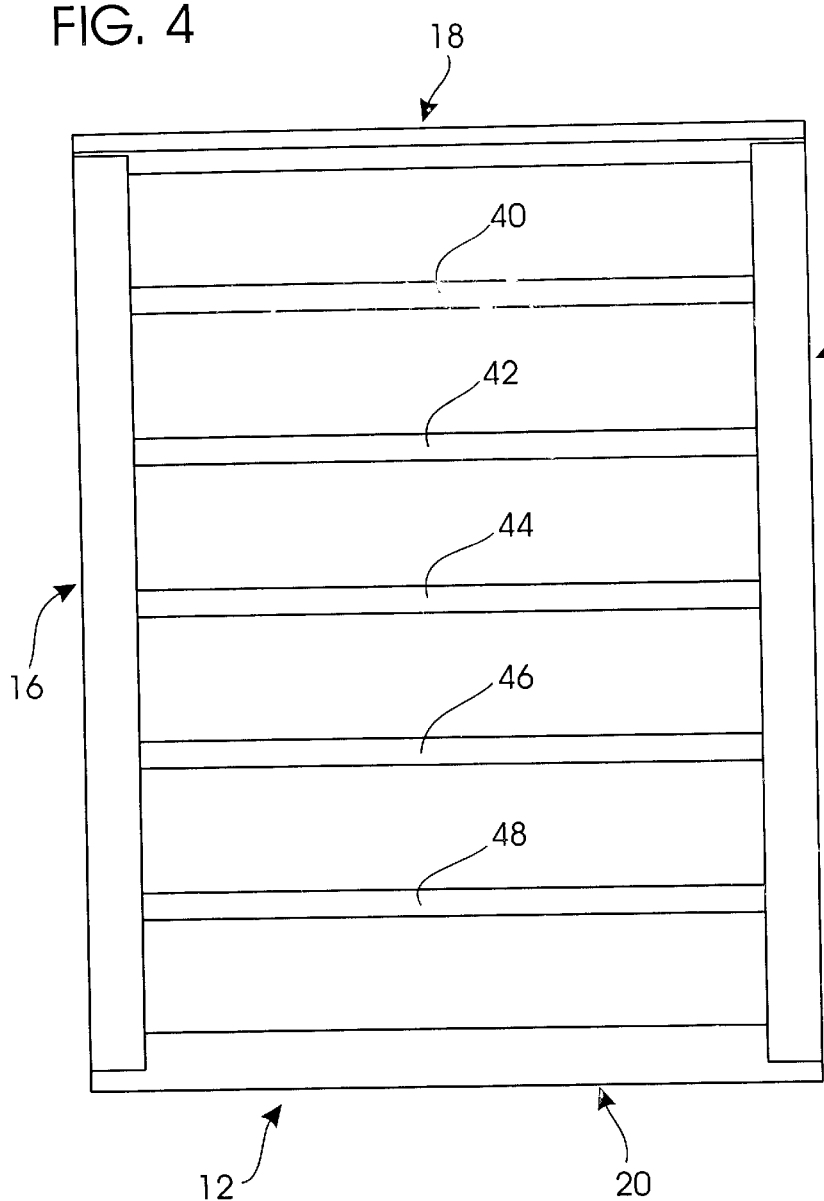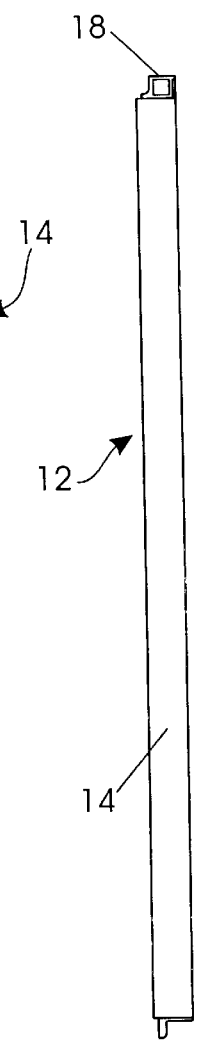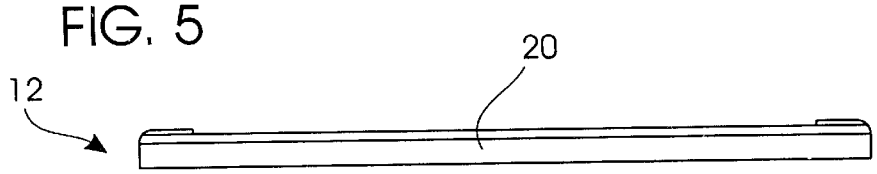

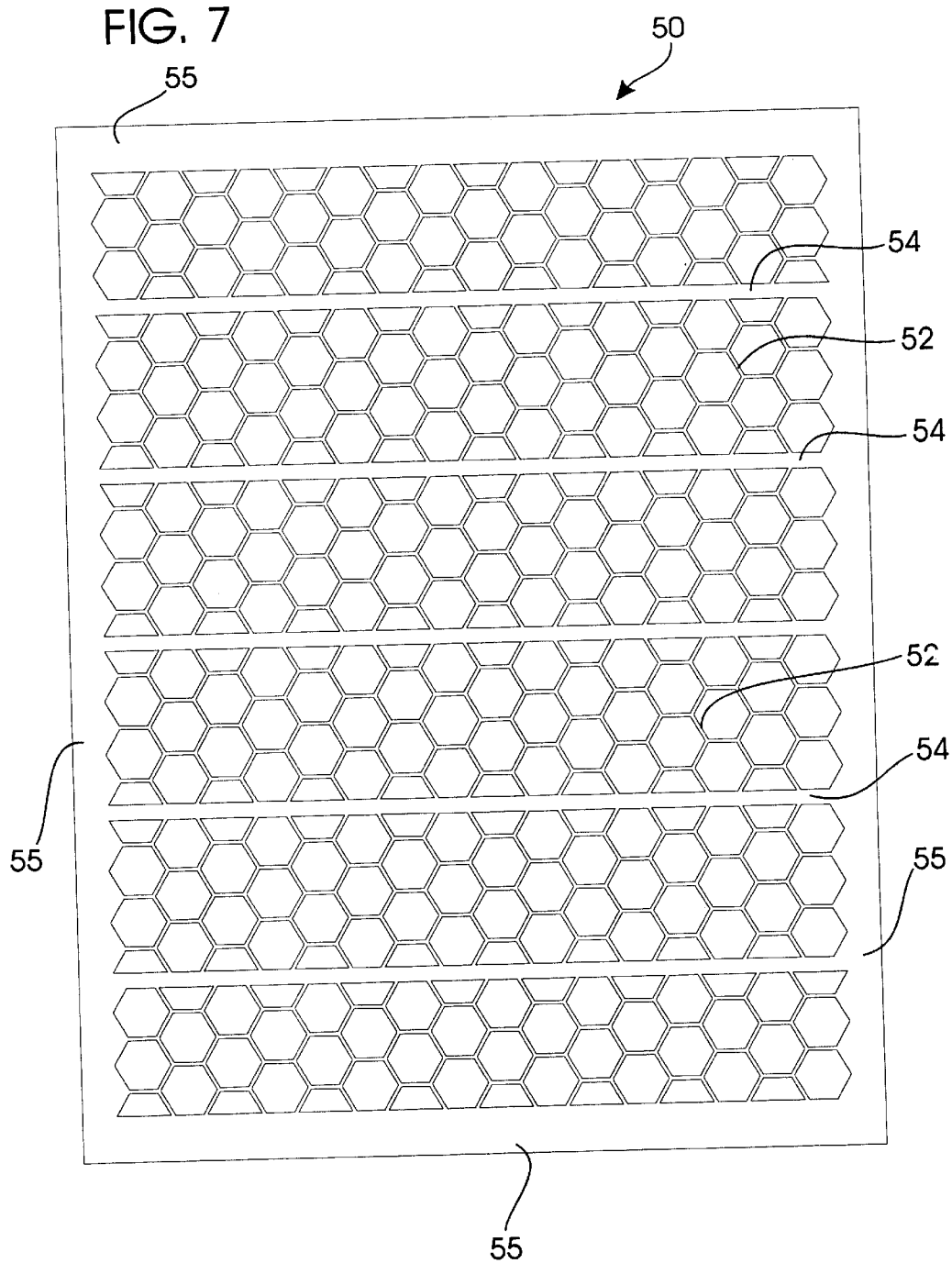

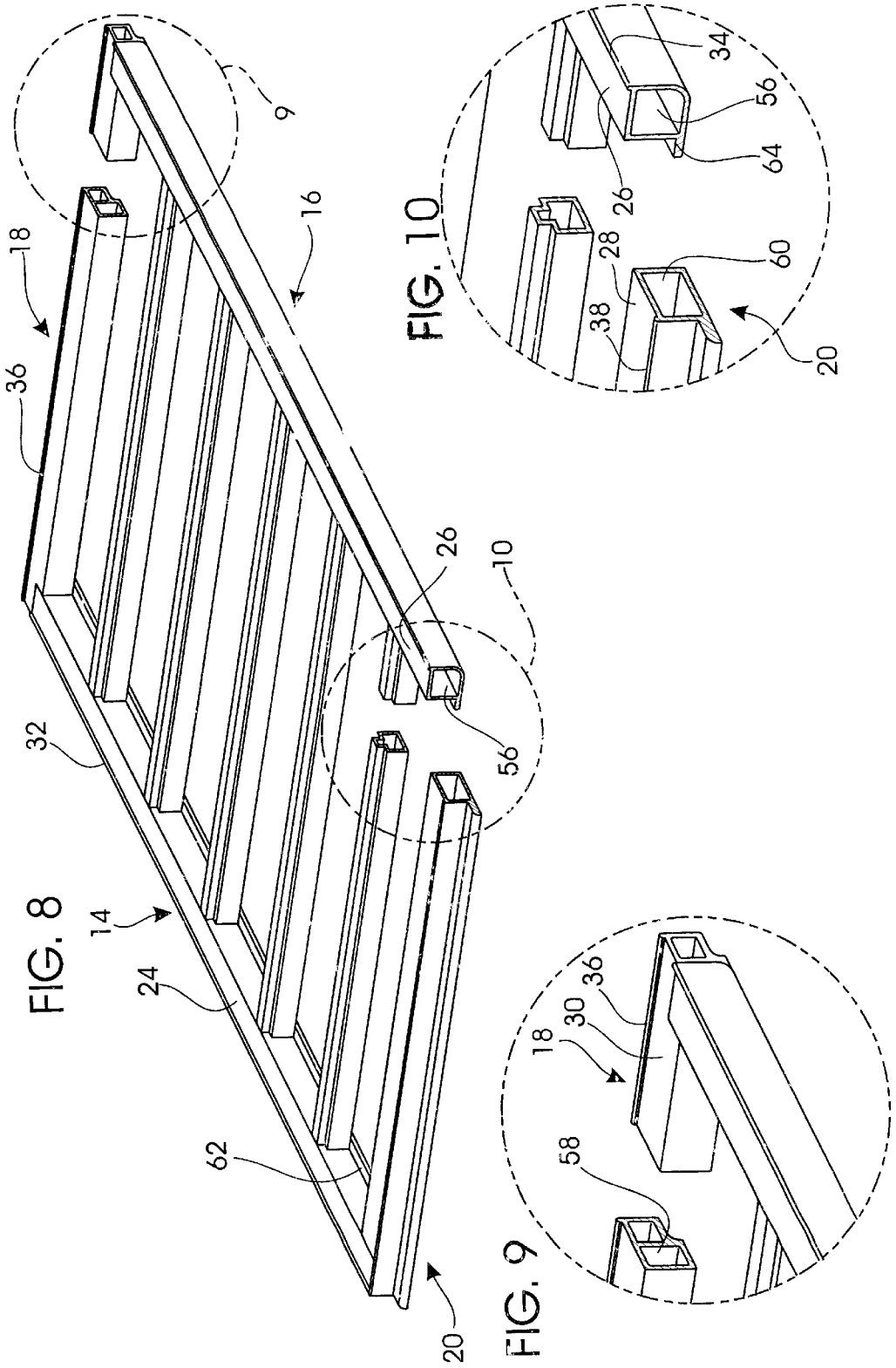

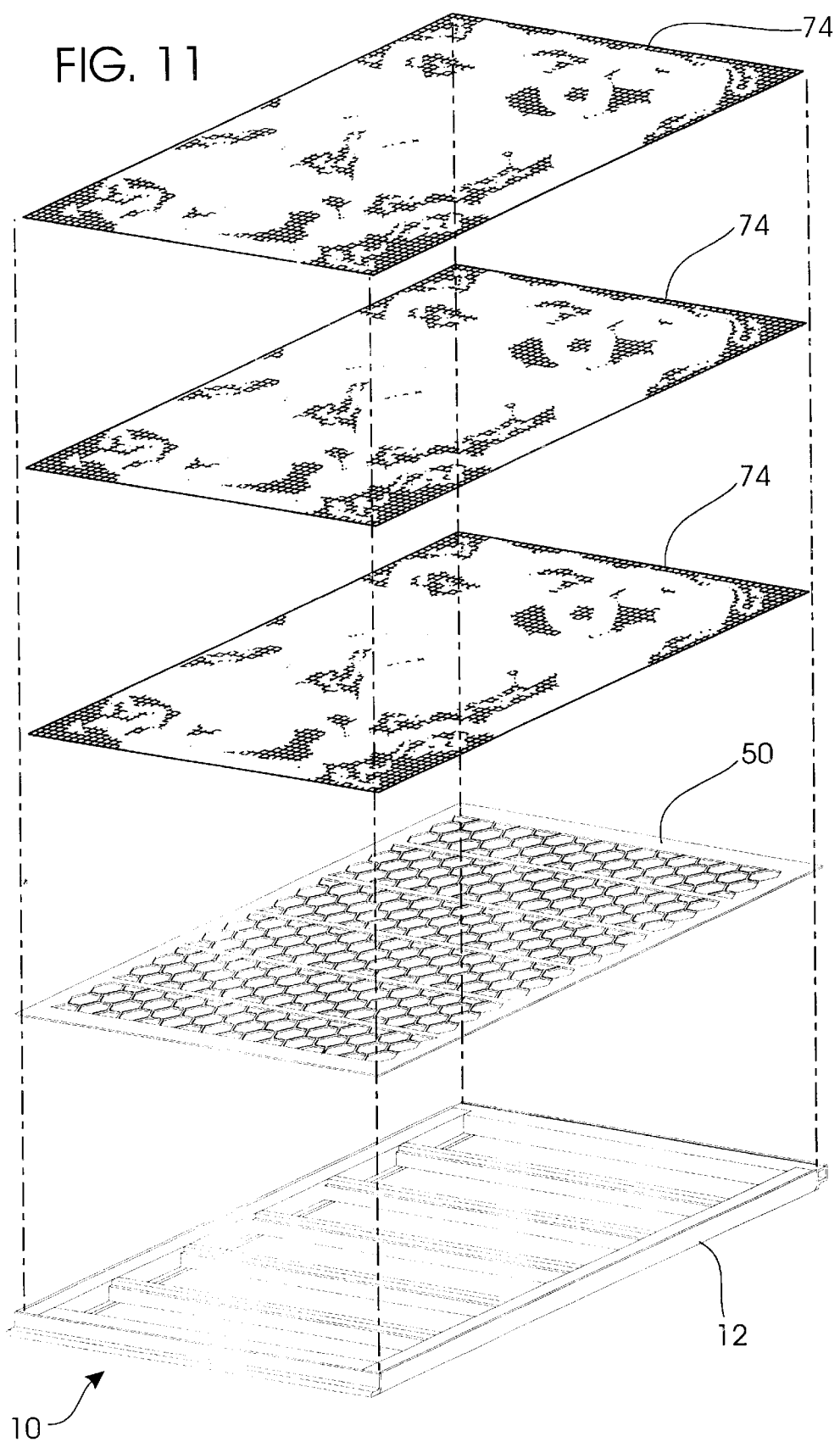

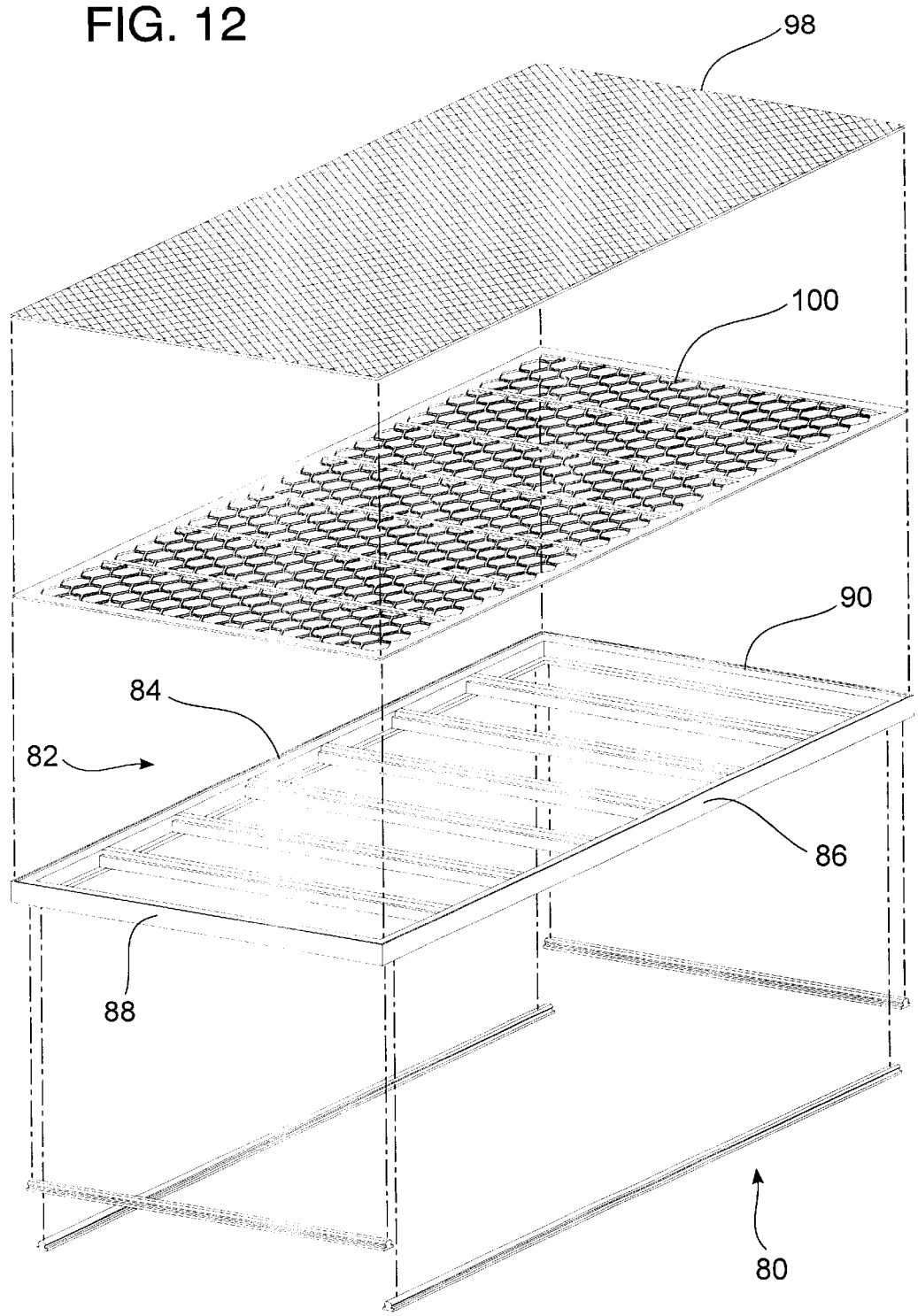

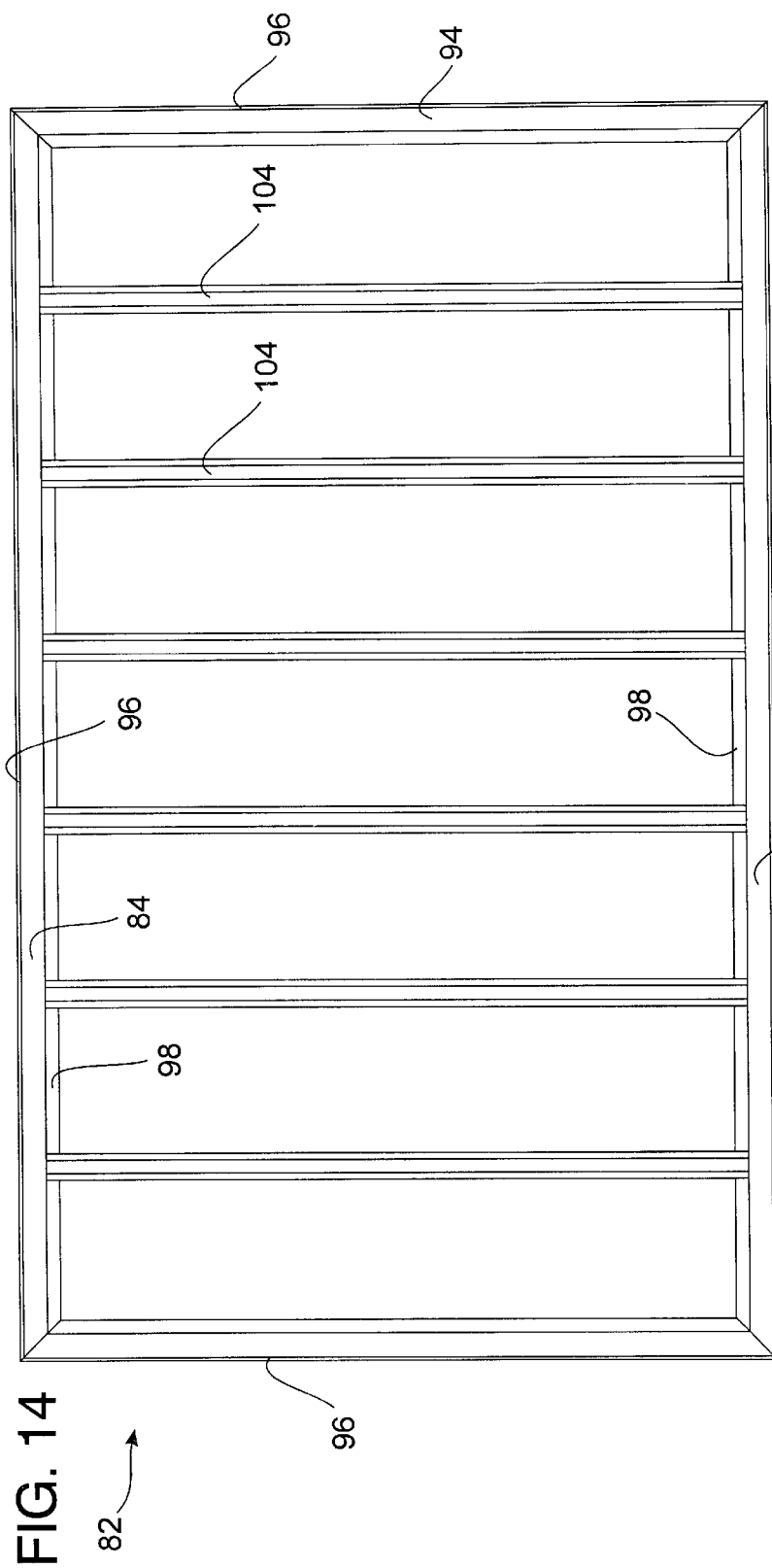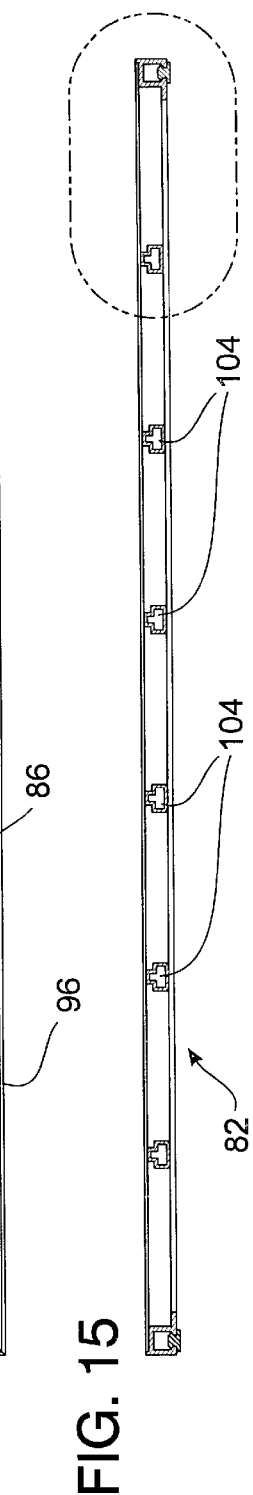
FIG. 14
FIG. 15

VIBRATING SCREEN ASSEMBLY WITH INTEGRATED GASKET AND FRAME

CROSS-REFERENCE TO RELATED APPLICATIONS

This application is a continuation-in-part of application Ser. No. 09/420,089 filed Oct. 18, 1999 entitled VIBRATING SCREEN ASSEMBLY WITH TUBULAR FRAME now U.S. Pat. No. 6,439,392 and is a continuation-in-part of application Ser. No. 08/922,205, filed Sep. 2, 1997 entitled VIBRATING SCREEN ASSEMBLY WITH IMPROVED FRAME, now U.S. Pat. No. 5,967,336 issued Oct. 19, 1999, and application Ser. No. 09/317,385 filed May 24, 1999 entitled SEAL FOR ADJOINING SCREEN ASSEMBLIES IN VIBRATING MACHINERY, now U.S. Pat. No. 6,269,954, issued Aug. 7, 2001.

BACKGROUND OF THE INVENTION

1. Field of the Invention

The present invention is directed to a screen assembly for vibrating screen machinery. In particular, the present invention is directed to a vibrating screen assembly for vibrating machinery having a tubular frame, a self alignment mechanism to align a perforated plate and accompanying screens on a frame, and an elastomeric gasket integrated with the frame secured without use of fasteners or adhesives.

2. Prior Art

Vibrating shakers utilize a screen assembly or a plurality of screen assemblies to separate solid material from liquids and fine solid particles. The screen assembly is typically secured in and to the vibrating machinery through use of a frame. In some cases, a single screen assembly will be utilized while in other cases, a plurality of screen assemblies will be aligned adjacent to each other end-to-end. The screen assembly is removably attached to the vibrating shaker. A mixture of materials is delivered or fed to the top of the screen assembly. The screen assembly is vibrated by a motor at a high frequency.

The force of gravity plus the vibration of the screen assembly separates the liquid from particles larger than the pore size made up by the combination of layers. This pore size is called the "cut point." The screen assembly may be inclined when secured in the vibrating shaker so that the solids larger than the cut point will move across the screen where they are gathered and disposed of. In other arrangements, one screen assembly is oriented in the shaker in angular relation to the other screen assembly. In each case, the liquid and particles smaller than the cut point pass through the screen assembly and are also collected.

Vibrating shaker machines are often used at remote locations, such as oil and gas well drilling sites. Thus, the replacement screen assemblies must be transported great distances to these remote locations. A relatively lightweight screen assembly is therefore desirable.

Since the screen assembly must be transported and then installed in the field, any sharp edges on the screen assembly should be minimized.

There are various types of screen assemblies having various frames. In one configuration, a plurality of screen cloth layers are attached to a perforated plate which is, in turn, connected to the frame. The perforated plate has a large number of small openings to minimize the unsupported spans of screen cloth. It is important to achieve good adhesion between the perforated plate and the frame. Thus, the frame must have an adequate planar surface to attach securely to the perforated plate.

The screen assembly is subject to tremendous stresses caused by the machinery vibrating it. Additionally, the screen assembly is subject to stresses from the weight of the material to be separated on the top layer of the screen. It is known that the screen assemblies will wear from usage and have a certain useful life, often in hours.

In order to balance screen life with through-put, it has been known to secure multiple layers of wire screen cloth to a perforated panel. The perforated panel is, in turn, secured to the frame. In the manufacturing process, the perforated panel and accompanying screens must be accurately aligned before adhesively bonding to the frame. It would be desirable to provide a self-alignment mechanism to align the perforated plate with the frame.

It is a principal object and purpose of the present invention to provide a vibrating screen assembly having a tubular frame which is both lightweight and rigid.

It is a further object and purpose of the present invention to provide a vibrating screen assembly having a frame which would position the perforated panel thereon during the assembly process and discourage separation of the frame from the perforated panel.

It is an additional object and purpose of the present invention to provide a vibrating screen assembly with a blunt, safe edge around the perimeter to prevent property damage and to prevent personnel injury.

It is an additional object and purpose of the present invention to provide a vibrating screen assembly with good adhesion between the frame and the perforated plate.

It is a further object and purpose of the present invention to provide a vibrating screen assembly that will have a maximum useful life while being simple and inexpensive to manufacture.

It is a further object and purpose of the present invention to provide a screen assembly having a strong tubular frame which will provide strength from side to side and provide strength from end to end.

In some vibrating shaker designs, the bed or deck which is composed of a plurality of parallel rails on which the screen assembly rests is not cushioned. In these instances, the screen assembly itself must have a gasket on the lower most side. The gasket not only acts as a cushion but provides a liquid-tight seal between the screen assembly and the vibrating shaker.

In the past, a neoprene or other gasket would be adhesively applied on the underside of the steel frame of the screen assembly. For example, an adhesive such as methyl methacrylate might be used. It has been found that the steel frame must be extremely clean or the adhesive will not function properly. Accordingly, a separate step of cleaning the frame has often been required. Additionally, the adhesive itself could be subject to failure if the proper amount of adhesive is not applied. Moreover, the screen assemblies may be subjected to corrosive materials at high temperatures. It is, therefore, required that the adhesive must be selected for the conditions being encountered. Corrosion of the gasket is possible depending on the materials being screened and the conditions being encountered.

Accordingly, it is a principal object and purpose of the present invention to provide a screen assembly having an integrated gasket with a mechanical lock which will not require any adhesives or fasteners.

It is a further object and purpose of the present invention to provide an integrated gasket and screen assembly wherein the gasket may be press fit into the frame of the screen assembly.

It is a further object and purpose of the present invention to provide an integrated elastomeric gasket and screen assembly wherein the gasket is both compressible and resilient.

SUMMARY OF THE INVENTION

The present invention is directed to a vibrating screen assembly having a tubular frame which includes a pair of opposed sides and a pair of opposed ends. The sides are opposed and parallel to each other. Each opposed side of the frame includes a rectangular tubular portion having a top that forms a flat planar surface.

Each opposed side has a flat planar surface and each end has a flat, planar surface which are aligned with each other in the assembled frame. An upstanding lip extends vertically from each of the planar surfaces, the lips together defining an area forming a rim enclosure.

A ledge extends from each side parallel to the planar surfaces inwardly. The ledges are opposed to and facing each other.

The frame also includes a plurality of tubular cross supports which extend between the sides and are parallel to the ends. The tubular cross supports and the ends rest on and are attached to the ledges.

A perforated plate is attached and secured to the frame in the assembled condition. The perforated plate includes a plurality of openings which are punched or otherwise formed in the plate.

The frame is adhesively secured to the perforated plate. The plate and a plurality of accompanying screen cloths are aligned on the frame by the lips which form the rim enclosure. Each of the lips is rounded or radiused at its top to help align and guide the plate during installation.

In order to produce a vibrating screen assembly in accordance with the present invention, the sides of the frame are extruded in lengths, such as from extruded aluminum. The ends may also be fabricated from extruded aluminum. The frame sections are cut to desired lengths to form the pair of opposed sides.

Likewise, lengths of tubular support are extruded, such as from extruded aluminum. Tubular support members are cut from these lengths to the desired dimension. The opposed sides, opposed ends, and tubular cross supports are clamped together and then welded. The joints between the cross supports and the sides of the frame and the ends and the sides of the frame are strengthened since the cross supports and ends rest on the ledges.

The perforated plate is fabricated with hexagonal or other openings and, thereafter, coated with epoxy. Both heat and pressure are used to bond the multiple screen mesh layers to the perforated plate. Accordingly, the perforated plate and the screen cloths are secured together. Thereafter, the perforated plate and the accompanying screen cloths are secured to the frame by glue or other adhesive or mechanical methods. The lips form a rim enclosure that aligns and guides the perforated plate and accompanying screen cloths on the frame. The plate is prevented from moving from side to side or end to end with respect to the frame because of the rim enclosure. The lip also provides a blunt, safe edge around the perimeter of the screen assembly which keeps personnel from cutting their hands.

Each of the opposed sides and each of the opposed ends includes an underside which is opposed to the top planar surface. The underside includes a continuous slot through each of the sides and ends. Inserted within the slot is an elastomeric gasket which may take a number of configurations within the teachings of the present invention. The gasket may be extruded from neoprene or other materials and then cut to desired lengths. The elastomeric gasket is both compressible and resilient. The gasket has a lower section which is flat and constructed to rest on the bed or rail of the vibrating shaker when in use. The gasket may be press fit so that an upper portion of the gasket will pass into and through the slot and reside in the hollow portion of the tubular side or tubular end. The gasket will be mechanically locked to the frame without use of any fasteners or adhesives.

BRIEF DESCRIPTION OF THE DRAWINGS

FIG. 4 is a bottom view of the frame shown in FIG. 1;

FIG. 5 is an end view of the frame shown in FIG. 4;

FIG. 6 is a side view of the frame shown in FIG. 4;

FIG. 7 is a top view of a perforated plate which is an element of the vibrating screen assembly of the present invention;

FIG. 8 is a perspective view of the frame of the present invention shown in FIG. 1 with portions cut away in two areas;

FIGS. 9 and 10 are enlarged views of the cut-away portions in FIG. 8;

FIG. 12 is an exploded view of a vibrating screen assembly shown in FIGS. 1 through 12;

FIG. 14 is a view of an underside of a frame of the screen assembly shown in FIG. 14;

FIG. 15 is a top view of the frame shown in FIG. 15;

DETAILED DESCRIPTION OF THE PREFERRED EMBODIMENTS

The embodiments discussed herein are merely illustrative of specific manners in which to make and use the invention and are not to be interpreted as limiting the scope of the instant invention.

Figure 1:
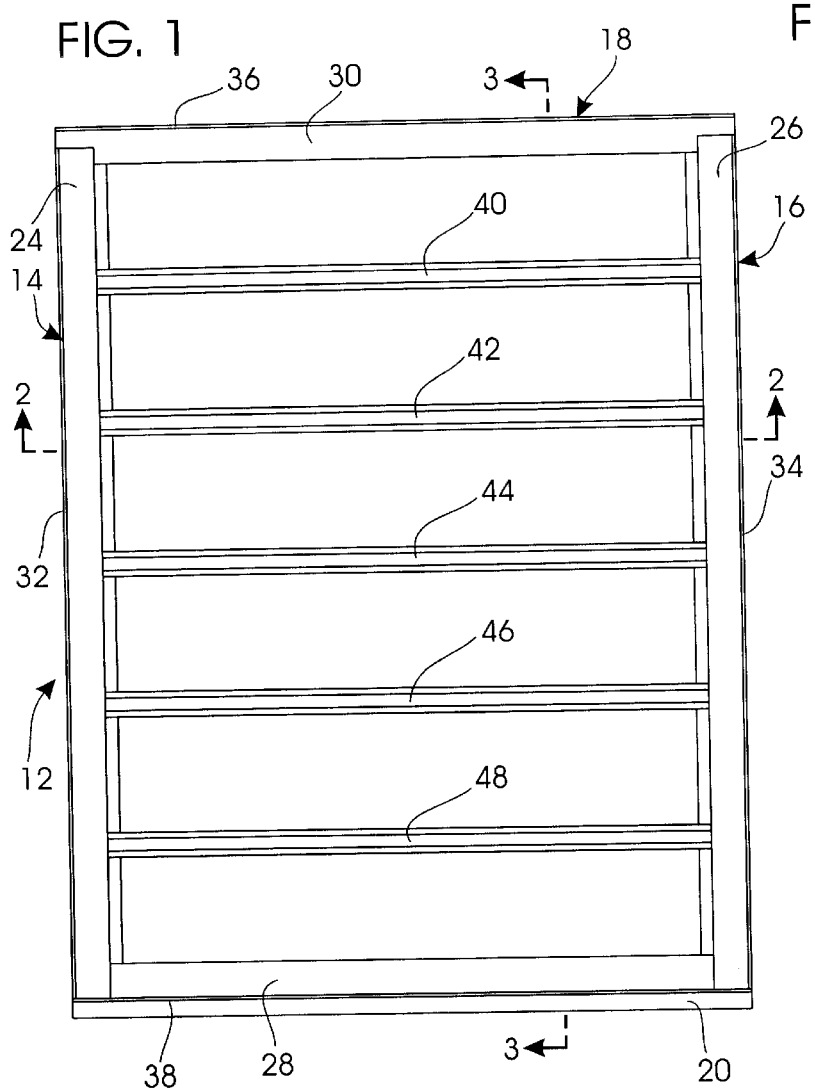
FIG. 1 is a top view of a frame which is an element of a vibrating screen assembly constructed in accordance with the present invention.
Figure 3:
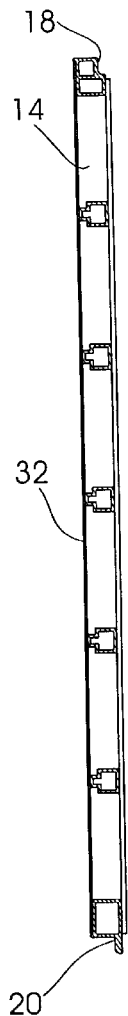
FIG. 3 is a sectional view of the frame taken along section line 3—3 of FIG. 1.
Figure 2:
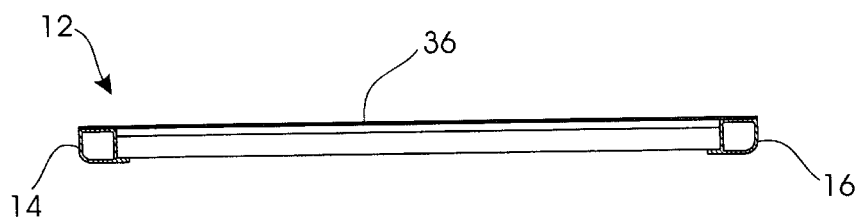
FIG. 2 is a sectional view of the frame taken along section line 2—2 of FIG. 1.

Referring to the drawings in detail, FIG. 1 illustrates a top view of a frame 12 which is an element of a vibrating screen assembly 10 (only the frame 12 seen in FIG. 1) constructed in accordance with the present invention. FIG. 2 illustrates a sectional view of the frame 12 taken along section line 2—2 of FIG. 1 and FIG. 3 illustrates a sectional view of the frame taken along section line 3—3 of FIG. 1.

The frame 12 includes a pair of opposed sides 14 and 16 and a pair of opposed ends 18 and 20. The sides 14 and 16 are opposed and parallel to each other. Likewise, the ends 18 and 20 are opposed and parallel to each other. The sides may be composed of the same pieces which may be cut to size from extruded lengths. In a preferred embodiment, the sides 14 and 16 and the ends 18 and 20 are composed of extruded aluminum material.

Each side 14 and 16 has a flat, planar surface 24 and 26, respectively. Likewise, each end 18 and 20 has a flat, planar surface 28 and 30, respectively. The flat planar surfaces 24, 26, 28 and 30 are aligned with each other in the assembled frame 12 to form a continuous flat planar surface.

Side 14 includes an upstanding lip 32 extending vertically from the planar surface 24. Side 16 includes an upstanding lip 34 extending vertically from the planar surface 26. The end 18 includes an upstanding lip 36 extending vertically from the planar surface 30. The end 20 includes an upstanding lip 38 extending vertically from the planar surface 28. The lips 32, 34, 36 and 38 together define an area forming a rim enclosure.

The frame 12 also includes a plurality of tubular cross supports 40, 42, 44, 46 and 48. It will be appreciated that a greater or lesser number of tubular supports might be employed within the teachings of the present invention. Each of the tubular supports extend between the sides 14 and 16 and are parallel to ends 18 and 20. The tubular supports in the present embodiment have a base which is rectangular in cross-section and a narrower top although other configurations are possible within the scope of the invention.

It has been found that the frame 12 provides superior strength both from side to side and from end to end.

FIG. 4 illustrates a bottom view of the frame 12 shown in FIGS. 1 through 3 while FIG. 5 shows an end view and FIG. 6 shows a side view of the frame 12.

FIG. 7 illustrates a top view of a perforated plate 50. As will be seen, the perforated plate 50 is attached to and secured to the frame 12 in the assembled condition. In a preferred embodiment, the perforated plate is fabricated from metal but other materials are possible. The perforated plate 50 includes a plurality of hexagonal openings 52 which are punched or otherwise formed in the plate. The perforated plate may also include unperforated areas 54 which will align with the tubular supports. The perforated plate also includes a border area 55 which will align with the planar surfaces of the frame 12, providing an area for good adhesion between the frame and the plate.

FIG. 8 illustrates a perspective view of the frame 12 with portions cut away. FIGS. 9 and 10 shows portions cut-away in FIG. 8 enlarged.

Each opposed side 14 and 16 includes a rectangular tubular portion 56. A top of the rectangular tubular portion 56 forms the planar surface 26. Side walls of the tubular portion 56 are perpendicular to the planar surface 26. Likewise, a top of the tubular portion of the side 14 forms the planar surface 24. Side walls of the tubular portion are parallel to planar surface 24.

The end 18 includes a rectangular tubular portion 58 wherein a top of the tubular portion forms a planar surface 30. The end 20 includes a rectangular tubular portion 60 wherein a top of the tubular portion forms planar surface 28. With the sides and ends fabricated from hollow tubes, a lightweight yet rigid frame is provided.

Finally, a ledge 62 and 64 extends parallel to each of the planar surfaces. Ledge 62 extends inwardly from side 14. Likewise, ledge 64 extends inwardly from side 16. The ledges 62 and 64 are aligned with, opposed to and face each other. The tubular cross supports 40, 42, 44, 46 and 48 each extend between the frame sides 14 and 16.

The tubular cross supports rest on and are connected to both ledges 62 and 64. The ledges 62 and 64 facilitate welding of each of the cross supports to the sides. Once assembled, the top of the tubular cross supports are aligned with the planar surface.

As best seen in FIGS. 1, 8 and 9, the end 18 is notched where it is joined with sides 14 and 16. As best seen in FIGS. 4 and 8, the end 20 is notched where it is joined with the sides 14 and 16. As best seen in FIGS. 4 and 8, the end 20 is notched where it is joined with sides 14 and 16.

FIG. 11 is an exploded view of the screen assembly 10. The frame 12 is adhesively secured to the perforated plate 50 with adhesive. The plate 50 and the accompanying screen cloths are aligned on the frame by the lips which form a rim enclosure.

The process for producing a vibrating screen assembly 10 of the present invention includes a number of steps. Initially, the sides 14 and 16 of the frame 12 are extruded in lengths, such as from extruded aluminum. The end 18 and end 20 may also be of extruded aluminum. These frame sections are then cut to desired lengths to form a pair of opposed sides 14 and 16 and a pair of ends 18 and 20.

Likewise, lengths of tubular support are extruded, such as from extruded aluminum. The tubular support members 40, 42, 44, 46 and 48 are cut from these lengths to the desired dimensions. The opposed sides and opposed ends are clamped together and then tack welded. Thereafter, the entire frame 12, including the cross supports, is welded together. As previously described, the tubular cross supports rest on the ledges. The connecting weld points may require some minor surface grinding for a smooth finish.

Prior to connecting the perforated plate 50 and accompanying screen cloths 74, the frame 12 may be cleaned with acetone or other cleaner.

The perforated plate 50 is fabricated with hexagonal or other openings and, thereafter, coated with epoxy. Both heat and pressure are used to bond the screen mesh layers to the plate 50. In the present embodiment, three layers of screen mesh are utilized although a greater or lesser number may be used. Accordingly, the perforated plate and the screen cloths are secured together.

If rough edges of screen mesh 74 extend from the edges of the perforated plate, these may be sheared off. Unlike in the past, it is unnecessary to grind the edges, since the combined plate 52 and screen layers 53 will be received within the rim enclosure of the frame 12.

The lips which form the rim enclosure form a blunt, safe edge around the perimeter of the screen assembly 12 for safe handling.

The perforated plate 50 and the accompanying screen cloths 74 are, thereafter, secured to the frame 12. In a preferred embodiment, a bead of glue or other adhesive is placed on the planar surfaces 24, 26, 28 and 30 of the frame 12. Adhesive may also be applied to the cross supports. In one embodiment, an acrylic adhesive such as methyl methacrylate is used. Each of the lips is rounded or radiused at its top to help align the plate during installation. The lips form a rim enclosure that align the perforated plate on the frame. Once the adhesive has cured, a secure bond is formed.

In usage on vibrating screen machinery, the perforated plate is prevented from moving side to side or end to end with respect to the frame because of the rim enclosure.

The joints between the cross supports and the sides and the joints between the ends and the sides of the frame are strengthened since the cross supports 40, 42, 44, 46 and 48 and ends 18 and 20 rest on the ledges. Accordingly, only an upward force would act to separate the cross supports 40, 42, 44, 46 and 48 from the sides or the ends and the sides.

FIGS. 12 through 23 illustrate an alternate embodiment of the present invention. FIG. 12 illustrates an exploded view of a vibrating screen assembly 80. A frame 82 includes a pair of parallel, opposed sides 84 and 86 and a pair of opposed, parallel ends 88 and 90. Tubular sides and ends are composed of extruded aluminum although other materials may be used.

Figure 13:
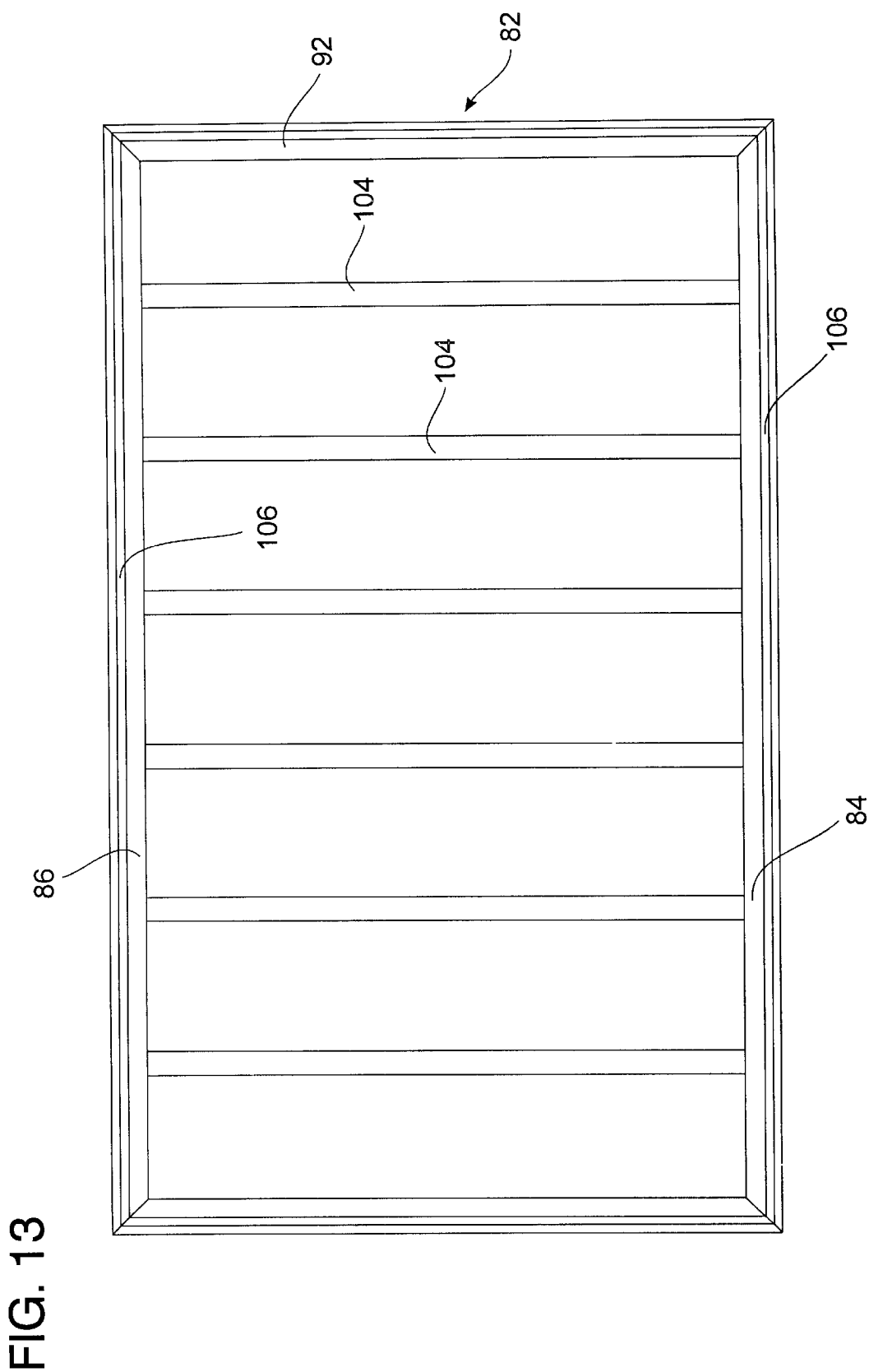
FIG. 13 is an exploded view of an alternate embodiment of a vibrating screen assembly constructed in accordance with the present invention.

The frame 82 includes an underside 92 shown in FIG. 13. A slot 106 is provided in each of the sides and each of the ends to form a continuous slot in the frame. The frame 82 also includes an opposed, top side 94 which is shown in FIG. 14.

Referring back to FIG. 12 and with continuing reference to FIG. 14, the top side 94 of the frame 82 has a flat planar surface. An upstanding lip 96 extends vertically from the flat planar surface in order to form a rim enclosure.

With continuing reference to FIG. 14, a ledge 98 extends inwardly from each of the opposed sides 84 and 86.

A perforated plate 100 is attached to and secured to the frame 82. At least one screen cloth 102 is secured to the perforated plate 100. In a preferred embodiment, the screen cloth or cloths 102 are bonded to the perforated plate 100 and the perforated plate will rest on the frame and be positioned thereon by the rim enclosure formed by the upstanding lips 96.

The frame 82 also includes a plurality of cross supports 104 which rest on the inwardly extending ledge 98.

The underside 92 of the frame 82 includes a continuous slot 106 through each of the sides and each of the ends as best seen in FIG. 15.

FIG. 15 illustrates a sectional view of the frame 82 apart from the perforated plate 100 and screen cloth 102. Inserted within the continuous slot 106 is a gasket 108 which may take a number of configurations within the teachings of the present invention. The gasket 108 may be extruded from neoprene or polyethylene or other materials and then cut into desired lengths, as best seen in FIG. 14. It may be necessary to miter the ends of the gasket 108 to match the frame or, alternatively, the ends of the gaskets can be sealed together.

Figure 16:
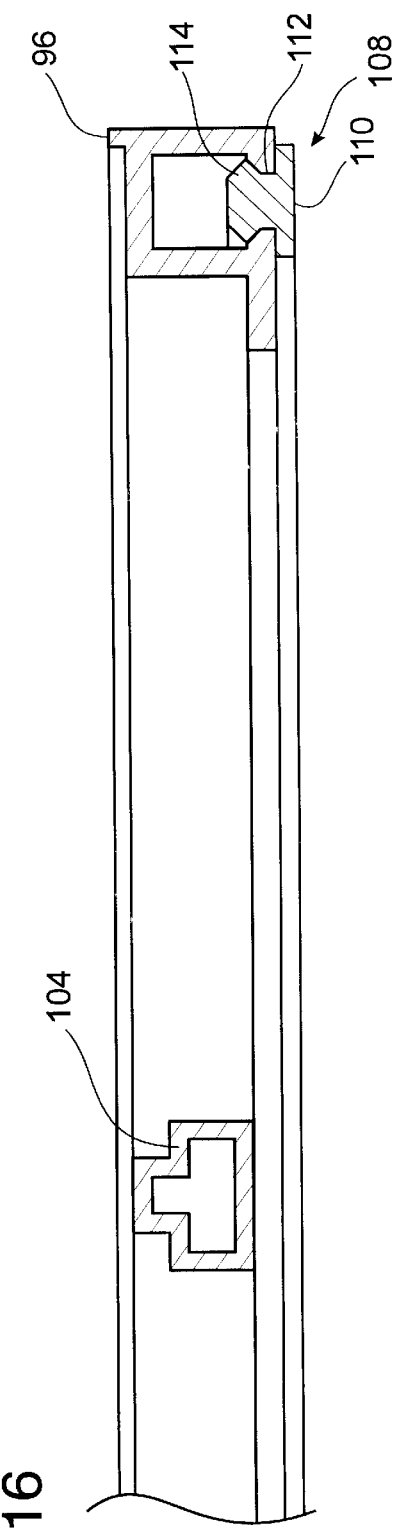
FIG. 16 is a sectional view of a frame with an elastomeric gasket installed therein.
Figure 17:
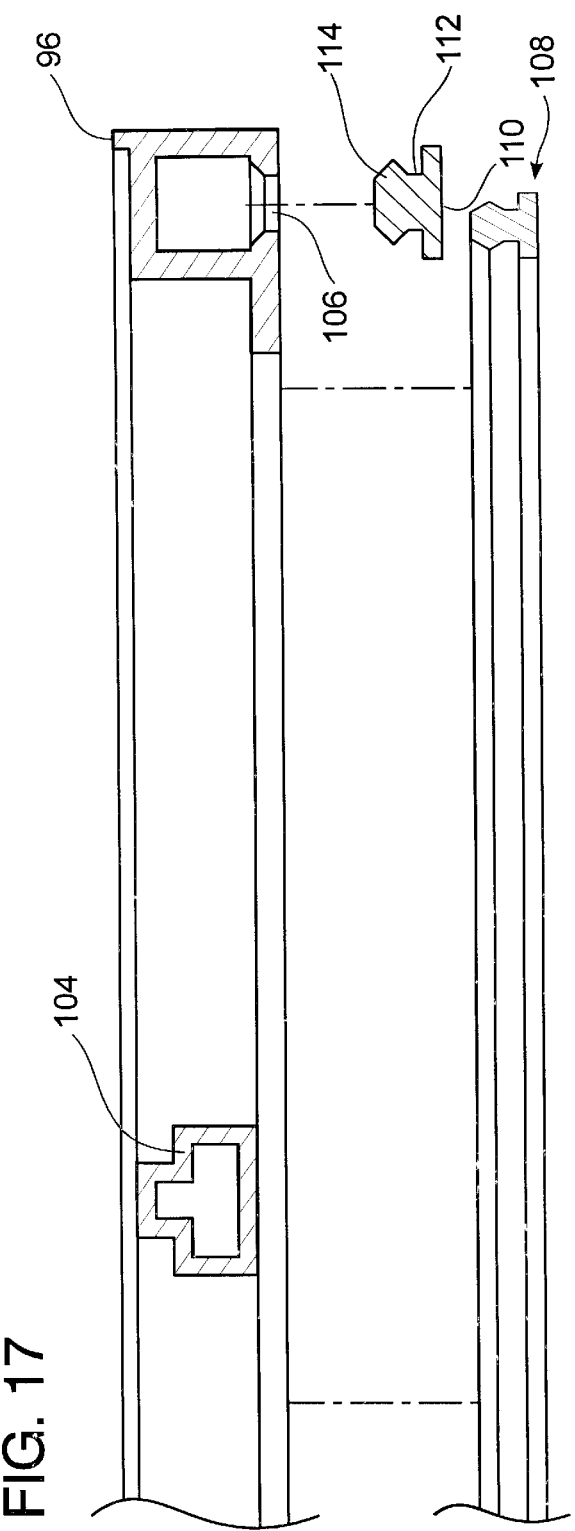
FIG. 17 is an enlarged view of a portion of the frame and gasket shown in FIG. 17.

FIGS. 16 and 17 show an enlarged view of a portion of the frame 82 and the elastomeric gasket 108. FIG. 16 shows the gasket 108 inserted into the frame 82 while FIG. 17 shows the gasket 108 apart from the frame. With specific reference to FIG. 17, the continuous slot 106 is visible as an opening through the frame 82. The slot 106 has a width and, in one embodiment, the slot has an internal bevel.

The gasket 108 is elastomeric as well as compressible and resilient. The gasket 108 has a lower section 110 which is flat and constructed to rest on the bed or rail of a vibrating shaker (not seen). The gasket also includes a reduced portion 112 having a width slightly less than the width of the slot 106. The gasket 108 also includes an upper portion 114 having a width larger than the width of the slot.

Figure 18:
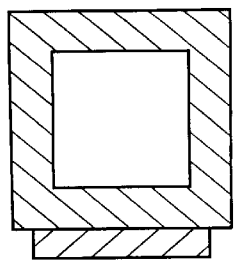
FIG. 18 is an exploded view of the portion of the frame and gasket shown in FIG. 18.

FIG. 18 illustrates a sectional view of a prior art configuration and a portion of the tubular frame and a gasket in cross section. The gasket would be adhesively secured to the underside of the frame.

FIGS. 19 through 23 illustrate various different embodiments incorporating the teachings of the present invention.

Figure 19:
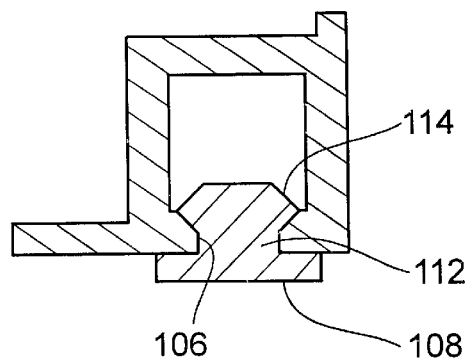
FIG. 19 is a cross-sectional view of a portion of a frame and a gasket found in the prior art.

FIG. 19 illustrates one preferred embodiment having a slot 106 through the underside of the frame. The gasket 108 also includes a reduced portion 112 having a width slightly less than the opening in the slot 106. The gasket also includes an upper portion 114 having a width larger than the width of the slot. The internal bevel in the slot is also visible. Accordingly, once the gasket 108 11 has been press fit into and through the slot, the upper portion 114 will prevent the gasket from being dislodged from the frame.

Figure 20:
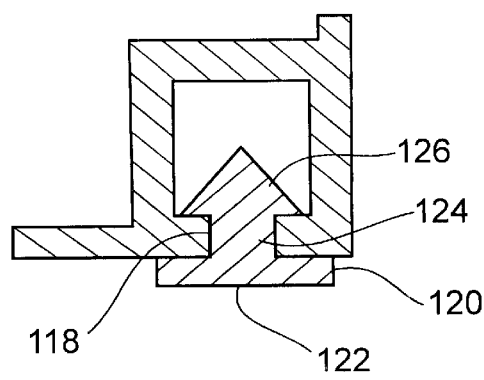
FIGS. 20 through 23 illustrate various configurations of the frame and integrated gasket utilizing the teachings of the present invention.

FIG. 20 shows an alternate embodiment of a gasket 120 and frame incorporating the teachings of the present invention. The side or end has a continuous slot 108 therethrough on the underside. The gasket 120 includes a lower surface 122 to rest on the vibrating shaker. The gasket 120 also includes a reduced portion 124 having a width less than the width of the slot 108. The gasket 120 also includes an upper portion 126 having a width larger than the width of the slot. In cross section, the upper portion of the gasket 120 is triangular in shape.

Figure 21:
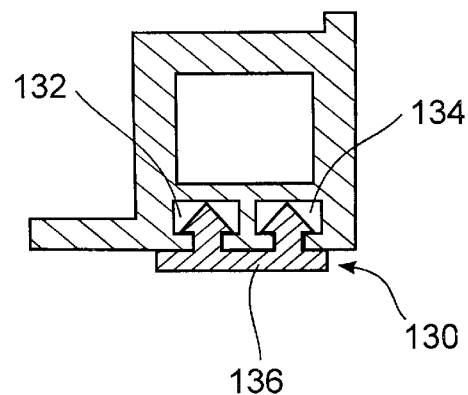

FIG. 21 illustrates a further alternate embodiment 130 of the invention. A tubular side includes a pair of openings 132 and 134 which do not penetrate the wall of the tubular side. A gasket 136 includes a lower surface which rests on the vibrating shaker. The gasket also includes a pair of upper portions which reside in the openings 132 and 134 in similar fashion to that shown above.

Figure 22:
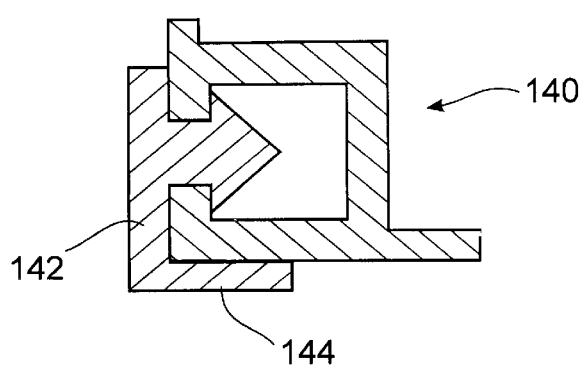

FIG. 22 illustrates a further alternate embodiment 140 of the present invention. A frame end or side has a slot through one of the side walls. A gasket 142, similar in configuration to the gasket shown in FIG. 20 is provided with a lip 144 which covers at least a portion of the underside of the tubular side or end.

Figure 23:
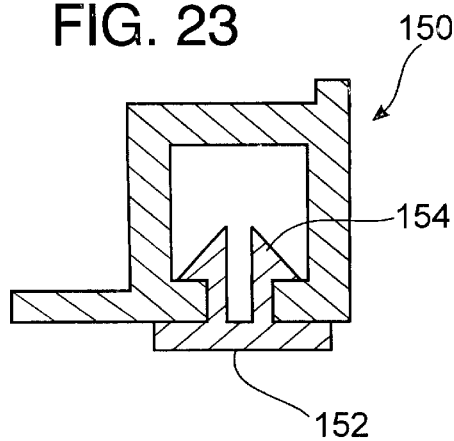

FIG. 23 illustrates a further alternate embodiment 150 of the present invention. The design of the gasket 152 is similar to that in FIG. 20 with the upper portion 154 having a gap to allow the upper portion to flex while being inserted in the sidewall.

The process for producing a vibrating screen assembly 80 in accordance with the present invention is similar to that described above.

The gasket may be applied either before or after securing the perforated plate and screen cloths. The frame will be turned so that the lower side of the frame is facing up. The gasket which has been formed as a continuous piece will then be cut to the desired lengths. The gasket lengths may be cut at 45° angles so that the individual pieces will mate together. Sealant may be applied to the mitered ends of the gasket to assure a fluid-tight seal where the gasket pieces meet together. By way of the present invention, no adhesives or fasteners are required to secure the gasket to the frame.

Whereas, the present invention has been described in relation to the drawings attached hereto, it should be understood that other and further modifications, apart from those shown or suggested herein, may be made within the spirit and scope of this invention.

What is claimed is:

1. A vibrating screen assembly which comprises:

a frame having a pair of opposed tubular sides and a pair of opposed tubular ends, each said side and each said end having a planar surface;

an upstanding lip extending vertically from each said planar surface to form a rim enclosure;

a ledge extending inwardly from said opposed sides;

a slot in at least said tubular sides;

a gasket that may be press fit into said slot and held therein; and at least one screen cloth supported on said frame and positioned thereon by said rim enclosure wherein said screen cloth is secured to said frame.

2. A vibrating screen assembly as set forth in claim 1 including a slot in said tubular ends which aligns with said slot in said tubular sides.

3. A vibrating screen assembly as set forth in claim 1 wherein said at least one screen cloth is bonded to a perforated plate and wherein said perforated plate rests on said frame and is positioned thereon by said rim enclosure.

4. A vibrating screen assembly as set forth in claim 1 wherein said tubular cross supports are welded to said opposed tubular sides.

5. A vibrating screen assembly as set forth in claim 1 including a plurality of said screen cloths.

6. A vibrating screen assembly as set forth in claim 1 wherein said sides and said ends are cut to size from extruded lengths.

7. A vibrating screen assembly as set forth in claim 6 wherein said sides and said ends are fabricated from aluminum.

8. A vibrating screen assembly as set forth in claim 3 wherein said screen cloths are bonded to said perforated plate by heat and pressure.

9. A vibrating screen assembly as set forth in claim 3 wherein said perforated plate and said screen cloths are secured to said frame by adhesive.

10. A vibrating screen assembly as set forth in claim 1 wherein said slot is in an underside of said sides and said ends opposed to said planar surface and forms a continuous channel.

11. A vibrating screen assembly as set forth in claim 1 wherein said elastomeric gasket is elastomeric, compressible and resilient.

12. A vibrating screen assembly as set forth in claim 1 wherein said elastomeric gasket is fabricated from neoprene.

13. A vibrating screen assembly as set forth in claim 1 wherein said gasket is fabricated from polyethylene.

14. A vibrating screen assembly as set forth in claim 1 wherein said gasket is cut to size from extruded lengths.

15. A vibrating screen assembly as set forth in claim 1 wherein said elastomeric gasket has a lower surface to rest on a vibrating shaker, a reduced portion having a width less than a width of said slot, and an upper portion having a width larger than said width of said slot.

16. A vibrating screen assembly as set forth in claim 15 wherein said gasket is neoprene.

17. A vibrating screen assembly as set forth in claim 15 wherein said gasket is polyethylene.

18. A vibrating screen assembly as set forth in claim 15 wherein said gasket has a lower surface to rest on a vibrating shaker, a reduced portion having a width less than a width of said slot, and an upper portion having a width larger than said width of said slot.

19. A vibrating screen assembly which comprises:

a continuous frame of a pair of side tubes and a pair of end tubes, each said tube having a planar surface;

a lip extending vertically from said planar surface to form a rim enclosure;

a ledge extending inwardly from said side tubes;

a slot in said continuous frame;

an elastomeric gasket mechanically locked in said slot without adhesive or fasteners; and a perforated plate with at least one screen cloth thereon positioned within said rim enclosure and secured to said planar surface.

20. A vibrating screen assembly as set forth in claim 19 including a plurality of tubular cross supports resting on said ledge and connected to said leg.

21. A vibrating screen assembly as set forth in claim 19 wherein said side tubes and said end tubes are each extruded and cut in lengths to form said sides and ends.

22. A vibrating screen assembly as set forth in claim 19 wherein each said side tube has a side wall perpendicular to said planar surface, wherein said ledge extends perpendicularly from said side wall.

23. A vibrating screen assembly as set forth in claim 19 wherein said slot is in an underside of said continuous frame opposed to said planar surface and forms a continuous channel.

24. A vibrating screen assembly as set forth in claim 19 wherein said gasket is elastomeric, compressible and resilient.

25. A vibrating screen assembly as set forth in claim 19 wherein said gasket is cut to size from extruded lengths.

* * * * *